United States Patent
Hassanshahi et al.

(10) Patent No.: US 12,326,850 B2
(45) Date of Patent: Jun. 10, 2025

(54) POLICY ENGINE FOR SUPPLY CHAIN SECURITY ANALYSIS

(71) Applicant: Oracle International Corproation, Redwood Shores, CA (US)

(72) Inventors: Behnaz Hassanshahi, Brisbane (AU); Alstair Michael, Brisbane (AU); Trong Nhan Mai, Brisbane (AU); Padmanabhan Krishnan, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/459,318

(22) Filed: Aug. 31, 2023

(65) Prior Publication Data

US 2025/0077502 A1 Mar. 6, 2025

(51) Int. Cl.
*G06F 16/20* (2019.01)
*G06F 16/23* (2019.01)
*G06F 16/242* (2019.01)

(52) U.S. Cl.
CPC ...... *G06F 16/2358* (2019.01); *G06F 16/2433* (2019.01)

(58) Field of Classification Search
CPC .................. G06F 16/2358; G06F 16/2433
See application file for complete search history.

(56) References Cited

U.S. PATENT DOCUMENTS

2019/0303579 A1* 10/2019 Reddy .................. H04L 9/3239
2020/0026510 A1* 1/2020 Adams ..................... G06F 8/70

OTHER PUBLICATIONS

Bravenboer, M., et al., Strictly Declarative Specification of Sophisticated Points-to Analyses, Oct. 25-29, 2009, 19 pages.
De Moura, L., et al., "Z3—a Tutorial", http://citeseerx.ist.psu.edu/viewdoc/download?rep=rep1&type=pdf&doi=10.1.1.225.8231. Viewed Jul. 22, 2013, 61 pages.
Ferraiuolo, A., et al., "Policy Transparency: Authorization Logic Meets General Transparency to Prove Software Supply Chain Integrity", Nov. 11, 2022, 11 pages.

* cited by examiner

*Primary Examiner* — Kristopher Andersen
(74) *Attorney, Agent, or Firm* — Lathrop GPM LLP

(57) ABSTRACT

A method utilizes a policy engine for supply chain security analysis. The method includes processing programming code, written in an imperative programming language, using a fact collector to instantiate a programming object representing a set of facts of a build system that includes an artifact. The method further includes processing the programming object using a mapper to expose the set of facts as a fact database. The method further includes evaluating a policy, written in a declarative programming language, and the fact database using a policy engine to construct a result corresponding to the artifact of the build system. The method further includes presenting the result with a supply chain security analysis of the artifact.

20 Claims, 5 Drawing Sheets

```
1  Policy("hosted-on-github", repo) :-
2     repository_attribute(repo,"remote_path",url),
3     match("^https://github.com.*$",url).
4
5  apply_policy_to("hosted-on-github", repo) :-
6     is_repo(repo).
```

FIGURE 4A

```
1  Policy("transitive",parent) :-
2     passed(parent, "SLSA3"),
3     dependency(parent,repo),
4     passed(repo, "SLSA3").
```

FIGURE 4B

```
1  Policy("SLSA3", repo) :-
2     buildService(repo),
3     ephemeralEnv(repo),
4     nonFalsifiableProvenance(repo).
```

FIGURE 4C

POLICY ENGINE FOR SUPPLY CHAIN SECURITY ANALYSIS

BACKGROUND

Supply chain security attacks have shown that the exploitation of supply chain security vulnerabilities is not restricted to one organization but may affect multiple organizations. By paying attention to the security of both the build system and the artifacts, organizations can enhance the overall security of their software supply chain, reducing the risk of distributing compromised software to their users. However, the space on supply chain security standards is evolving rapidly. For example, significant changes to the supply-chain levels for software artifacts (SLSA) (pronounced "salsa") standard, from version 0.1 to 1.0, are being proposed. Given the current dynamic situation, different organizations may be interested in developing unique security postures. Such postures may adopt specifications from different standards. Furthermore, such postures may be dynamic as the needs of the organization evolves. The dynamic nature provides a challenge for a single tool to handle the different, evolving requirements.

SUMMARY

In general, in one or more aspects, the disclosure relates to a method utilizing a policy engine for supply chain security analysis. The method includes processing programming code, written in an imperative programming language, using a fact collector to instantiate a programming object representing a set of facts of a build system that includes an artifact. The method further includes processing the programming object using a mapper to expose the set of facts as a fact database. The method further includes evaluating a policy, written in a declarative programming language, and the fact database using a policy engine to construct a result corresponding to the artifact of the build system. The method further includes presenting the result with a supply chain security analysis of the artifact.

In general, in one or more aspects, the disclosure relates to a system utilizing a policy engine for supply chain security analysis. The system includes at least one processor and an application executing on the at least one processor to utilize one or more of a fact collector, a mapper, and a policy engine operating. The application processes programming code, written in an imperative programming language, using a fact collector to instantiate a programming object representing a set of facts of a build system that includes an artifact. The application further processes the programming object using a mapper to expose the set of facts as a fact database. The application further evaluates a policy, written in a declarative programming language, and the fact database using a policy engine to construct a result corresponding to the artifact of the build system; and The application further presents the result with a supply chain security analysis of the artifact.

In general, in one or more aspects, the disclosure relates to a non-transitory computer readable storage medium storing computer readable program code which, when executed by a processor, performs a computer-implemented method utilizing a policy engine for supply chain security analysis. The method includes processing programming code, written in an imperative programming language, using a fact collector to instantiate a programming object representing a set of facts of a build system that includes an artifact. The method further includes processing the programming object using a mapper to expose the set of facts as a fact database. The method further includes evaluating a policy, written in a declarative programming language, and the fact database using a policy engine to construct a result corresponding to the artifact of the build system. The method further includes presenting the result with a supply chain security analysis of the artifact.

Other aspects of the one or more embodiments will be apparent from the following description and the appended claims.

BRIEF DESCRIPTION OF DRAWINGS

FIG. 3, FIG. 4A, FIG. 4B, and FIG. 4C show examples in accordance with one or more embodiments of the disclosure.

Like elements in the various figures are denoted by like reference numerals for consistency.

DETAILED DESCRIPTION

Embodiments of the disclosure approach the issues above by using a trusted fact collector to generate facts for a policy engine and uses the policy engine as a checker and not a fact collector. The policy engine checks facts based on the information gathered by the fact collector and specified policies. A mapper is used that ensures that the fact collector is decoupled from the policy engine while working in a seamless fashion.

Two issues may arise, the first being identifying the language to express the policies and the second being the identification of the facts for analysis according to the policies. The facts are the basic properties to be obtained in a trusted fashion from the build system being analyzed. Embodiments of the disclosure may address the first issue of policy expression by using a declarative programming language and address the second issue of fact identification by using an imperative programming language to identify the facts used for policy analysis and expose those facts as a database to policy engine for analysis.

Figure 1:
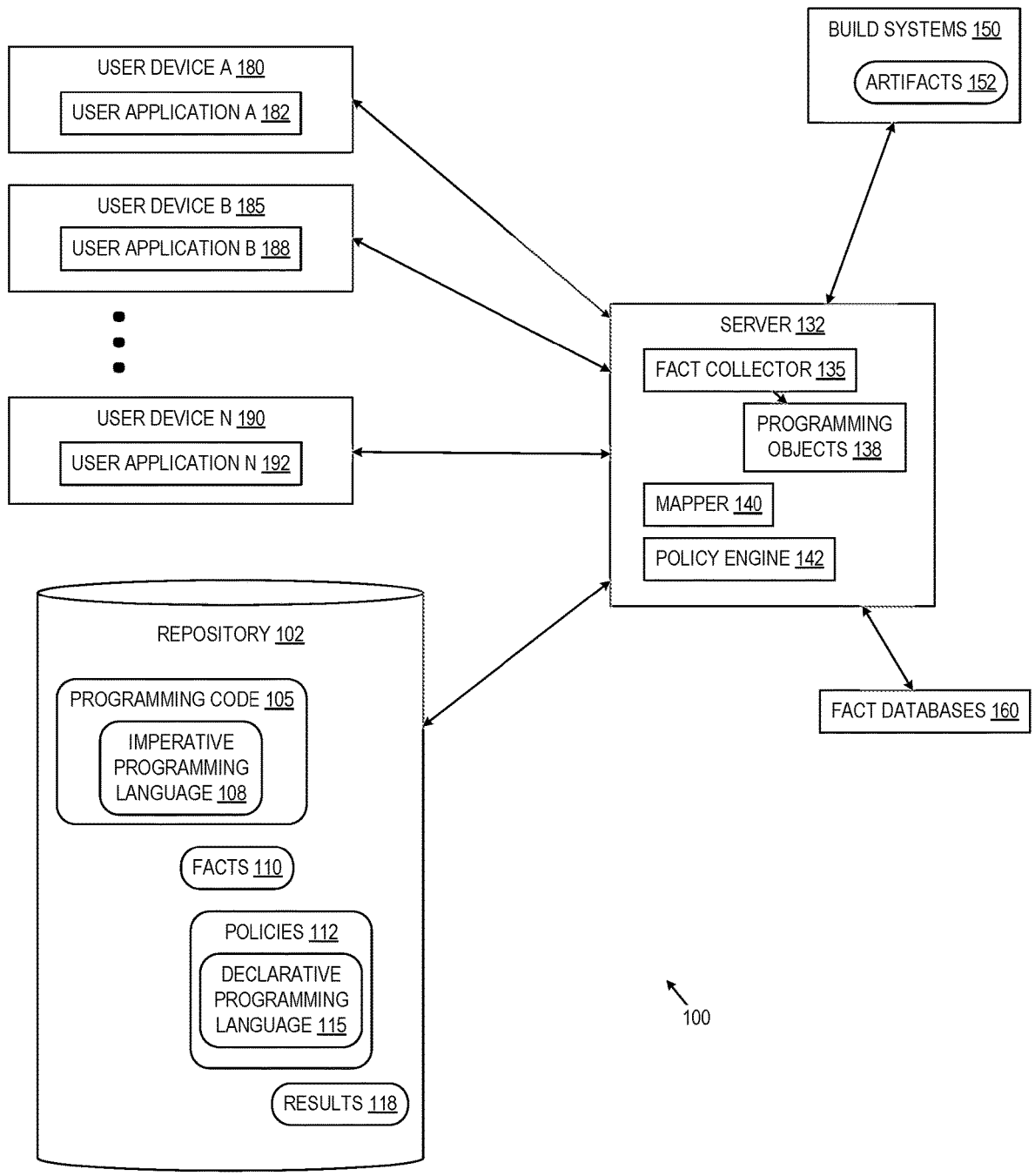
FIG. 1 shows a computing system, in accordance with one or more embodiments of the disclosure.

Turning to FIG. 1, the system (100) is a computing system shown in accordance with one or more embodiments. The system (100) and corresponding components may utilize the computing systems described in FIGS. 5A and 5B to perform supply chain security analysis. Different architectures may be used. The system (100) includes the repository (102), the server (132), the build systems (150), the fact databases (160), and the user devices A (180) and B (185) through N (190).

The repository (102) is a type of storage unit and/or device (e.g., a file system, database, data structure, or any other storage mechanism) for storing data. The repository (102) may include multiple different, potentially heterogeneous, storage units and/or devices. The repository (102) stores data utilized by other components of the system (100). The data stored by the repository (102) includes the programming code (105), the facts (110), the policies (112), and the results (118).

The programming code (105) is a set of instructions written in accordance with a programming language that may be executed by a computer, e.g., the server (132).

Execution of the programming code (105) by the fact collector (135) generates the programming objects (138), which extract the facts (110) from the build systems (150). In one embodiment, the programming code (105) is written using the imperative programming language (108).

The imperative programming language (108) is a type of programming language that follows an imperative paradigm, which is based on a sequence of statements that change the state of a program during execution. In this paradigm, the steps or operations the computer performs are specified to achieve a desired outcome. Imperative programming is centered around describing how to accomplish a task using a series of commands. Examples of imperative programming languages include C, C++, Java, Python, JavaScript, Ruby, etc.

The facts (110) are information extracted from the build systems (150) by the fact collector (135). A fact from the facts (110) is a piece of information that is objectively true about the build systems (150) and can be verified or proven to be true. In one embodiment, the facts (110) may be stored in the repository (102) as a serialization of the programming objects (138). In one embodiment, the facts (110) may be stored in the repository (102) as a file of a database.

The facts (110) corresponding to the build systems (150) may include determinations related to secure infrastructure, code signing, dependency management, updates and patching, etc. For secure infrastructure, the facts (110) may identify that the build systems (150) run on secure infrastructure with restricted access to prevent unauthorized changes. For code signing, the facts (110) may identify that code signing is implemented to ensure the authenticity and integrity of the artifacts (152). For dependency management, the facts (110) may identify that the use of dependencies are controlled and monitored during the build process to prevent the inclusion of vulnerable or malicious libraries. For updates and patching, the facts (110) may identify that build systems (150) are kept up to date with the latest security patches and updates.

The facts (110) corresponding to the artifacts (152) may include determinations related to checksums and signatures, secure distribution, static and dynamic analysis, etc. For checksums and signatures, the facts (110) may identify that checksums and digital signatures are provided for the artifacts (152) to verify integrity and authenticity. For secure distribution, the facts (110) may identify that secure channels are used to distribute artifacts to end-users, preventing man-in-the-middle attacks or unauthorized modifications. For static and dynamic analysis, the facts (110) may identify that security testing and analysis is performed on the artifacts to identify potential vulnerabilities or malware.

The policies (112) are files that enumerate the rules used to check supply chain security for generating the results (118). The policies (112) may be generated in accordance with software supply chain security standards that are sets of guidelines and best practices designed to enhance the security and integrity of software throughout the development, distribution, and deployment processes. The policies (112) are written in accordance with the standards to address potential risks and threats that can arise in the software supply chain, including malicious code injections, unauthorized access, data breaches, and other security vulnerabilities. Using the policies (112) to adhere to the standards helps ensure that software products are free from tampering and meet specific security criteria. The supply chain security standards that may be used by the policies (112) may include Supply Chain Levels for Software Artifacts (SLSA), NIST SP 800-161, ISO/IEC 27036, ISO/IEC 27001, ISO/IEC 27034, NIST Cybersecurity Framework, Software Assurance Maturity Model (SAMM), OWASP Software Assurance Maturity Model (OpenSAMM), etc. In one embodiment, the policies (112) are written using the declarative programing language (115).

The declarative programing language (115) is a type of programming language that follows a declarative paradigm to describe what should be achieved rather than explicitly defining how it should be accomplished as with the imperative paradigm. In other words, the declarative paradigm emphasizes the "what" rather than the "how" of the computation or problem-solving process as with the imperative paradigm. Using the declarative paradigm, the desired outcome or the problem to be solved is specified and the runtime system for the declarative programming language (115) handles determining the most efficient way to achieve that outcome. Using the declarative programing language (115) to write the policies (112) allows for a higher level of abstraction and may be more expressive, concise, and easier to read and understand as compared to using the imperative programming language (108).

The results (118) are the outputs generated by processing the policies (112) using the fact databases (160). The results (118) provide the supply chain security analysis of the build systems (150), which may be transmitted to and displayed by the user devices A (180) and B (185) through N (190).

Continuing with FIG. 1, the system (100) also may include the server (132). The server (132) is one or more computing systems, possibly in a distributed computing environment. An example of the server (132) may be the computing system shown in FIG. 5A.

The server (132) may host and/or execute one or more processes, software, applications, etc. For example, the server (132) may execute the fact collector (135), the mapper (140), and the policy engine (142). Different embodiments may execute the fact collector (135), the mapper (140), and the policy engine (142) using different computing systems and servers. The server (132) may interact with the user devices A (180) and B (185) through N (190) to generate, process, and display the results (118) for the supply chain security analysis of the build systems (150). The server (132) includes the fact collector (135), the mapper (140), and the policy engine (142).

The fact collector (135) is the hardware or software components of server (132) that generate the facts (110). The fact collector (135) executes the programming code (105) to generate the programming objects (138).

The programming objects (138) are runtime objects executing on the server (132). The programming objects (138) store information extracted from the build systems (150) that form the facts (110).

The mapper (140) is the hardware and software components of the server (132) that generate the fact databases (160). The mapper (140) maps the facts (110) to the fact databases (160) to expose the information from the facts (110) through the fact databases (160).

The policy engine (142) is the hardware and software components of the server (132) that generates the results (118). The policy engine (142) processes the policies (112) using the fact databases (160) to generate the results (118).

The build systems (150) are the set of tools and processes used to compile, assemble, and package source code into a deployable software application or library. The build systems (150) take the source code, along with dependencies, and transforms the source code into the artifacts (152), which may include executable binaries or other files. The build systems (150) may additionally run tests, generate documentation, applying code optimizations, etc. From a security analysis perspective, the security of the build system is the part of the software supply chain being analyzed. A compromise or vulnerability in the build system may lead to malicious code being injected into the artifacts (152), which may then be distributed to end-users. Attackers may target the build system to introduce backdoors, trojans, or other forms of malware.

The artifacts (152) are the output of the build processes used by the build systems (150). The artifacts (152) are the compiled and packaged versions of the software that is ready for deployment. The artifacts (152) may include executable files, libraries, documentation, configuration files, additional components, etc. Security analysis of artifacts involves ensuring that they have been produced by a trusted and secure build system, and that the artifacts (152) do not contain any hidden vulnerabilities or malicious code. Verifying the integrity and authenticity of the artifacts (152) identifies that the artifacts (152) have not been tampered with or altered during the build and distribution process.

The fact databases (160) are structured collections of data that is organized and stored in a way that allows for efficient retrieval, management, and manipulation of information. The data stored within the fact databases (160) includes the facts (110), which form the basis of the supply chain security analysis of the build systems (150). The fact databases (160) serve as repositories for storing and managing data about the build systems (150). In one embodiment, the data in the fact databases (160) is organized into tables, which include rows and columns. Each row in a table may represent a single record, and each column may represent a specific attribute or field of the data. Each build system and artifact may correspond to multiple rows and columns. Columns of tables related to the build systems (150) may include columns related to facts for secure infrastructure, code signing, dependency management, updates and patching, etc., as described above. Columns of tables related to the artifacts (152) may include columns related to facts for checksums and signatures, secure distribution, static and dynamic analysis, etc., as described above.

Continuing with FIG. 1, the user devices A (180) and B (185) through N (190) may interact with the server (132). The user devices A (180) and B (185) through N (190) may be computing systems in accordance with FIGS. 5A and 5B. The user devices A (180) and B (185) through N (190) may include and execute the user applications A (182) and B (188) through N (192).

In one embodiment, the user device A (180) is operated by a user to perform a supply chain security analysis on one or more of the artifacts (152) and corresponding build systems (150). After processing a set of the policies (112) by the server (132), the user device A (180) receives a set of the results (118) that are displayed using the user application A (182).

Although described within the context of a client server environment with servers and user devices, aspects of the disclosure may be practiced with a single computing system and application. For example, a monolithic application may operate on a computing system to perform the same functions as one or more of the user application A (182), the fact collector (135), the mapper (140), and the policy engine (142).

Figure 2:
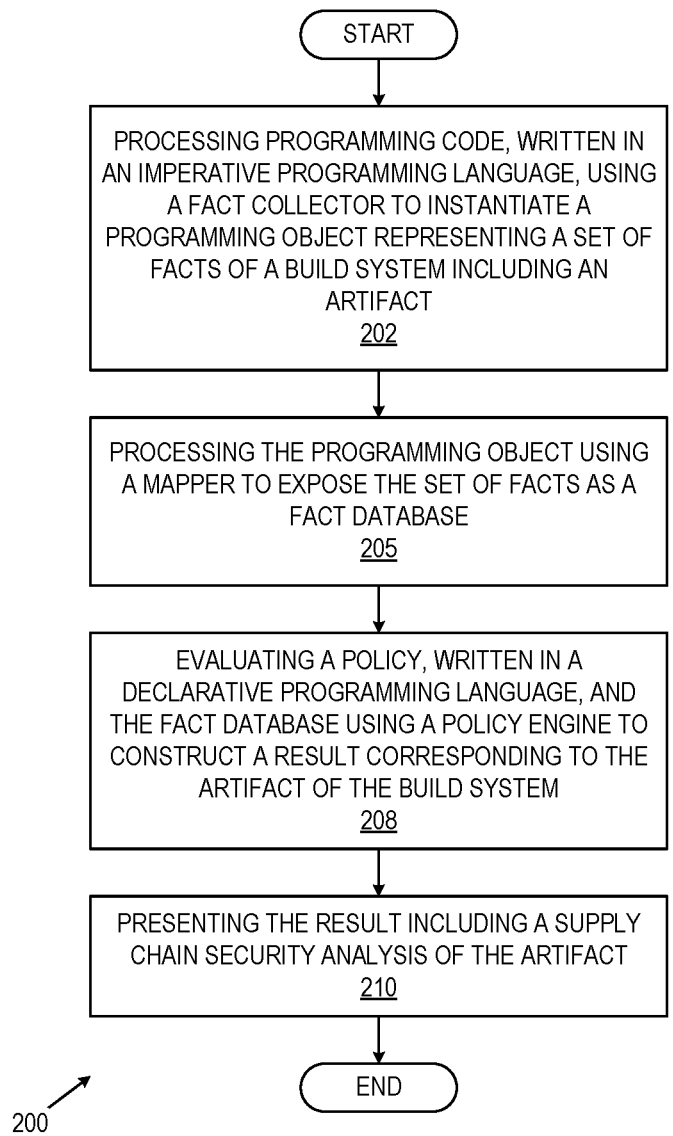
FIG. 2 shows a method in accordance with one or more embodiments of the disclosure.

Turning to FIG. 2, the process (200) uses a policy engine for supply chain security analysis. The process (200) may be performed using components from the system (100) of FIG. 1.

Step 202 of the process (200) includes processing programming code, written in an imperative programming language, using a fact collector to instantiate a programming object representing a set of facts of a build system including an artifact. In one embodiment, the programming object is instantiated using the imperative programming language.

In one embodiment, the set of facts are extracted from the build system to be analyzed with respect to a policy that comes from an organization, which may be different than the organization of the build system. The language used for the policy is sufficiently expressive in order for the policy to be effective in specifying the facts to be analyzed from the build system to analyze the supply chain security of the build system.

The fact collector gathers information about the build system, the project used to build the artifact, the build process utilized, and dependencies thereof to provide a representation of the software supply chain. The information gathered is used to determine the provenance of the project, ensure security and compliance, and gate the use and distribution of the artifact. The fact collector may perform several steps to extract information about the build system and artifact that is persisted as a set of facts in the programming object. The facts may be persisted to the programming objects by creating properties within the programming objects that store the facts.

In one embodiment, the fact collector may analyze the build system and its configuration files, which may use different programming languages. The build systems may have specific configuration files like pom.xml for Maven (Java), package.json for npm (JavaScript), build.gradle for Gradle (Java/Kotlin), etc. The fact collector reads and interprets these files to understand the dependencies, build steps, and other relevant information that is stored in a programming object.

In one embodiment, the fact collector may identify the dependencies required for building the artifact. This includes both direct and transitive dependencies. The fact collector gathers information about libraries, frameworks, and other components used by the project, along with their versions and licenses, which is information that may be persisted to the properties of the programming object instantiated by the fact collector.

In one embodiment, the fact collector may parse the files of the artifact to gather information about the structure and components of the project from which the artifact is created. The fact collector may extract data about modules, classes, functions, variables, and any other code entities, which may involve static code analysis to identify potential security vulnerabilities or other issues, which is information that may be persisted to the properties of the programming object instantiated by the fact collector.

In one embodiment, the fact collector may extract metadata from the artifact and build system, including version numbers, timestamps, authors, and contributors. The extracted metadata may provide information on the history and evolution of the project that created the artifact and corresponding components, which is information that may be persisted to the properties of the programming object instantiated by the fact collector.

In one embodiment, the fact collector may gather information about the development environment, such as the operating system, compiler version, and other relevant details for the build system and artifact. Information about the development environment may be collected to determine the reproducibility of the build environment of the build system and ensure consistency across different systems and platforms, which is information that may be persisted to the properties of the programming object instantiated by the fact collector.

In one embodiment, the fact collector may identify the licenses associated with the dependencies used in the project. The license and dependency information may be used to determine compliance with open-source licenses and avoiding potential legal issues, which is information that may be persisted to the properties of the programming object instantiated by the fact collector.

In one embodiment, the fact collector may look into the build process used by the build system to create the artifact and analyze the steps involved in compiling and assembling the files for the artifact. The information about the build process may be used to determine how the build system operates and what commands are executed during the process, which is information that may be persisted to the properties of the programming object instantiated by the fact collector.

In one embodiment, the fact collector may utilize additional tools or services to analyze the code for security vulnerabilities, code quality issues, and potential risks. The use of external tools may involve integration with security scanners or code analysis platforms and the collected information may be persisted to the properties of the programming object instantiated by the fact collector.

Step 205 of the process (200) includes processing the programming object using a mapper to expose the set of facts as a fact database. To process the programming object using the mapper to expose the set of facts stored in the programming object as a fact database, several steps may be employed.

A data model may be created that represents the structure of the programming object and the facts stored with a programming object. Creation of the data model may involve defining classes of the programming object that map to database tables of the fax database as well as defining the attributes that correspond to the facts to be stored.

The mapper may be configured to connect to the fact database that stores the facts. The connection configuration may include specifying the database type, connection string, and other relevant settings.

Step 208 of the process (200) includes evaluating a policy, written in a declarative programming language, and the fact database using a policy engine to construct a result corresponding to the artifact of the build system. In one embodiment, the result is determined from the set of facts gathered about the artifact and the build system by the fact collector and exposed by the mapper. In one embodiment, the policy uses the design space of the declarative programming language and is not limited to a predefined sets of rules or logic within the design space of the declarative programming language. As discussed below, evaluating the policy may include several steps and may be performed after the fact collector is used to gather information about the artifact and build system.

In one embodiment, the policy is written in a declarative programming language and saved to a repository. The policy specifies the conditions and rules to be satisfied for the analysis of the software supply chain of the artifact and build system. For example, the policy might state that all direct dependencies must have a specific license or that certain security vulnerabilities should not be present in the artifact.

In one embodiment, the policy is loaded and parsed by the policy engine. Loading and parsing the policy may include extracting the conditions and rules specified within the policy to the memory used by the policy engine.

After loading and parsing the policy, the policy may be evaluated by the policy engine against the set of facts gathered by the fat collector. The policy engine may check whether the conditions specified in the policy are satisfied based on the information collected from the artifact and the build system. To evaluate the policy, the rules and conditions specified in the policy may be compared to the set of facts and the facts database to determine if the artifact and build system comply with the rules and conditions from the policy.

Step 210 of the process (200) includes presenting the result including a supply chain security analysis of the artifact. In one embodiment, the result may be presented by transmitting the result to a client device that displays the result in an application.

In one embodiment, the process (200) includes locking access to the artifact to prevent use of the artifact based on the result. In one embodiment, locking access to the artifact may include the policy engine invoking use of an access control system to enforce access restrictions to the artifact based on the result of the supply chain security analysis.

In one embodiment, the process (200) includes processing the policy to update the result without updating the fact database. Operation of the fact collector, to update the fact database, may be decoupled from operation of the policy engine to update the result from processing a policy. By decoupling, the fact collector may not be operated each time the policy engine is operated to reduce the amount of computing resources used when evaluating a policy.

In one embodiment, the set of facts gathered by the fact collector includes a set of historical facts referenced by a policy. Facts may include historical periodic fact collections so that a policy may determine whether a fact has been true during the historical period. For example, the fact of whether a binary file has changed for the last 2 weeks, 1 month, 2 months, etc., may be recorded to a fact database and a policy may require that a binary file of the artifact for a specified duration, e.g., 3 weeks, 6 weeks, etc.

In one embodiment, processing the programming code by the fact collector is triggered by detecting a change to the programming code. The programming code may be updated by a developer or the process to add new facts to check for in the artifact and build system. The process (200) may receive a notification or periodically check the version number of the programming code to trigger processing the programming code by the fact collector.

In one embodiment, processing the programming code by the fact collector is triggered by detecting a change to the build system. For example, a notification or periodic check of the host domain, internet protocol address, or additional parameters of the build system may trigger the processing of the programming code.

In one embodiment, processing the programming code by the fact collector is triggered by detecting a change to the artifact. For example, a notification or periodic check of the metadata (sizes, hash values, file names, etc.) for the code files, binary files, etc., of the artifact may trigger the processing of the programming code.

In one embodiment, processing the programming code by the fact collector is triggered periodically. For example, the fact collector may be scheduled to operate, daily, weekly, monthly, quarterly, etc.

In one embodiment, processing the policy to update the result is triggered periodically. For example, the policy engine may be scheduled to operate daily, weekly, monthly, quarterly, etc. The schedule for the periodic policy engine operation may be different from the schedule for the periodic operation of the fact collector. In one embodiment, the period for the operation of the policy engine shorter than the period for operation of the fact collector.

In one embodiment, processing the policy is triggered by detecting a change to the policy. The policy may be updated by a developer or another process to add new rules or conditions to check for in the artifact and build system. A notification may be received, or a periodic check the version number of the policy may be performed, to trigger processing the policy by the policy engine.

Figure 3:
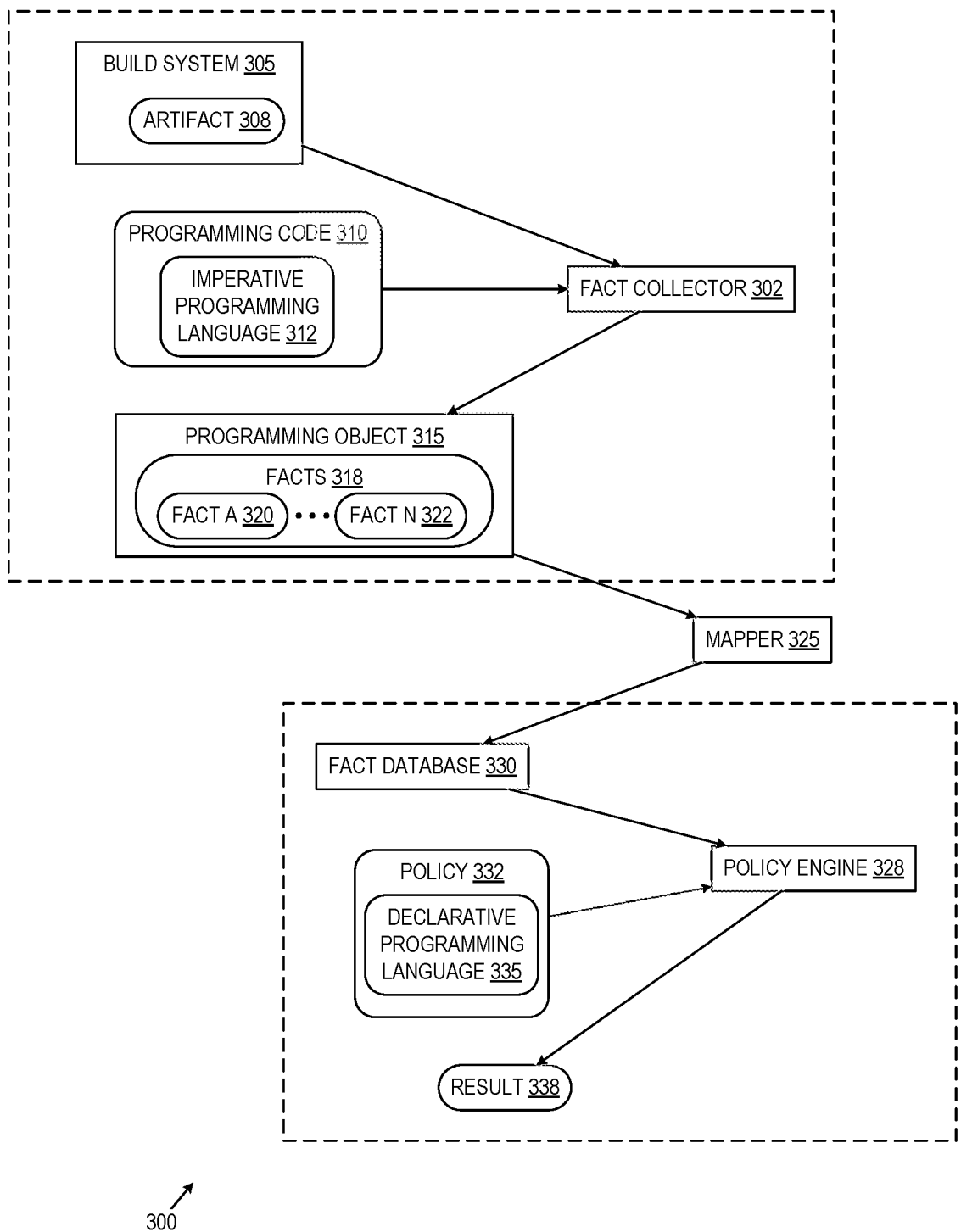

Turning to FIG. 3, the diagram (300) illustrates the flow of data through a system to analyze software supply chain security. The data flow of the diagram (300) maybe a default from the system (100) of FIG. 1 using computing systems described in FIGS. 1, 5A, and 5B.

The fact collector (302) includes hardware and software components that process the programming code (310) generate the programming object (315) to persist an analysis of the build system (305) and the artifact (308). The fact collector (302) loads the programming code (310), which is written in the imperative programming language (312) and defines the classes, objects, properties, attributes, functions, etc. of the programming object (315). In one embodiment, the imperative programming language (312) is Python. The build system (305) includes the artifact (308) and is analyzed by the fact collector (302) as the fact collector (302) executes the programming code (310). Execution of the programming code (310) generates the programming object (315), which includes the facts (318). The facts (318) include the fact A (320) through the fact N (322), which are information about the build system (305) and the artifact (308) and may be persisted as properties of the programming object (315).

The mapper (325) maps the information about the build system (305) stored in the programming object (315) to the fact database (330). In one embodiment, the mapper (325) maps the facts (318) to the cells of the rows and columns of the fact database (330).

The policy engine (328) processes the policy (332), written in the declarative programming language (335), with information from the fact database (330) to construct the result (338). In one embodiment, the declarative programming language (335) is Datalog. In one embodiment, the result (338) may be output to a command line interface in response to a command to invoke the policy engine (328) to evaluate the policy (332) using the fact database (330). In one embodiment, the policy engine (328) is a constraint solver application.

In one embodiment, the result (338) may be analyzed by a process running on a computing system that determines if the result (338) indicates that the artifact (308) is compliant with the policy (332). When the artifact (308) is not compliant with the policy (332), an access control system may be invoked to prevent use of the artifact (308) by other processes and users. When the artifact (308) is compliant with the policy (332), the access control system may be invoked to allow use of the artifact (308) by other processes and users.

Turning to FIG. 4A, the policy (400) has that the components of an artifact (the artifact referred to as a repository or "repo" in the policy (400)) are to be hosted on a particular domain ("github.com"). A rule for the domain host is expressed in the policy (400) using a declarative programming language (e.g., Datalog). The policy (400) relies on the fact collector for generating a fact associated with location of the repository, which is named "remote_path". The value associated with this attribute is checked to match with "github.com". The rule "apply_policy_to" from lines 5 and 6 of the policy (400) states that the policy "hosted-on-github" should apply to all repositories (i.e., any item marked as a repo for an artifact to satisfy the policy).

Turning to FIG. 4B, the policy (430) relates to requirements of SLSA-level 3 on transitive dependencies. Here, the fact collector generates information related to transitive dependencies. The fat collector may use additional tools, (e.g., a "dependency:tree" command of the Maven build automation tool) to generate the appropriate information. In the case of the build automation tool Gradle, the fact collector may further analyze the output of the build automation tool as the command "gradlew dependencies" of Gradle may yield a dependency tree. The analysis by the fat collector also determines if the repositories have passed SLSA level 3. Determining whether SLSA level 3 is passed may be optional. If the SLSA level 3 requirements can be broken down into other properties, then the tasks for checking those properties may be specified in the policy and performed by the policy engine without the policy engine invoking the build automation tool.

Turning to FIG. 4C, the policy (460) determines whether a build (i.e., an artifact) meets SLSA level 3 if the build uses a build service (e.g., "GitHub Actions" rather than being performed on a machine of the developer), if the build ran on an ephemeral environment (e.g., a fresh virtual machine (VM) that was not reused from previous builds), and the provenance generated by the build is not-falsifiable (e.g., cannot be tampered with). Here, the back to collector decides when the predicate "buildService" (of line 2 of the policy (460)) is satisfied. Note that such information can include the usage of trusted tools in the build process (e.g., slsa-github-generator https://github.com/slsa-framework/slsa-github-generator). Once the fact collector has generated the necessary facts (depending on the desired granularity), the policy engine may enforce the rules on the relevant repositories.

Figure 5A:
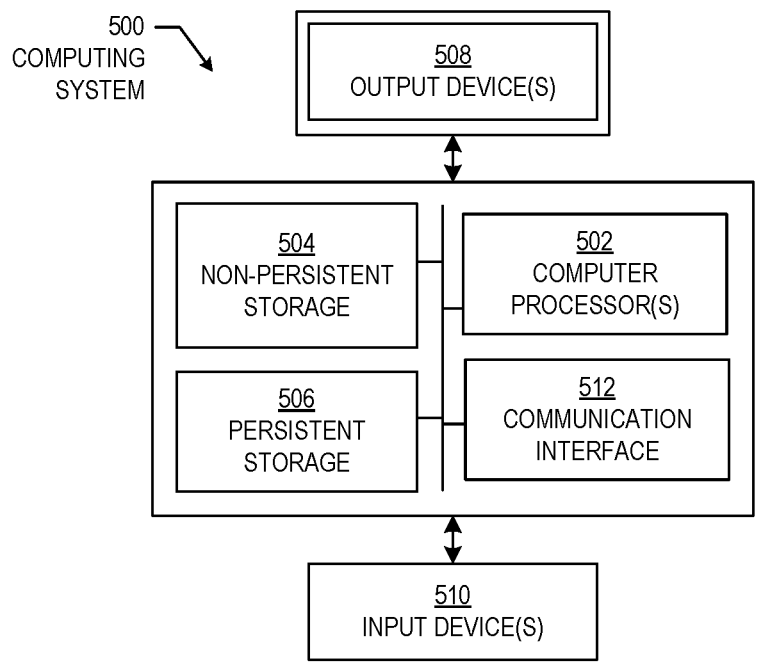
FIG. 5A and FIG. 5B show a computing system and network environment, in accordance with one or more embodiments of the disclosure.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage device(s) (504), persistent storage device(s) (506), a communication interface (512) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing units (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (508). The inputs may include text input, audio input, video input, etc., which may be processed and transmitted by the computing system (500) in accordance with the disclosure. The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (508) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 5B:
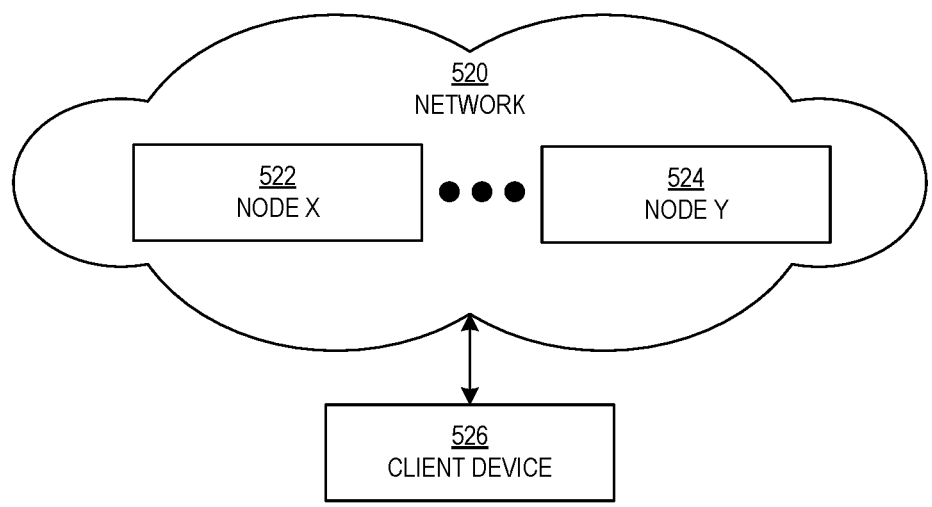

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the word "or" is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    processing programming code, written in an imperative programming language, using a fact collector to instantiate a programming object, from the programming code, representing a set of facts of a build system comprising an artifact;
    processing the programming object using a mapper to expose the set of facts as a fact database,
        wherein the fact database is organized into tables with rows and columns, and
        wherein the mapper exposes the set of facts by mapping the set of facts, of the build system, stored in the programming object to the fact database;
    evaluating a policy, written in a declarative programming language, and the fact database, exposing the set of facts from the programming object, using a policy engine to construct a result corresponding to the artifact of the build system; and presenting the result comprising a supply chain security analysis of the artifact.

2. The method of claim 1, wherein presenting the result comprises:
locking access to the artifact to prevent use of the artifact based on the result.

3. The method of claim 1, wherein evaluating the policy comprises:
updating the result, by processing the policy, without updating the fact database, by processing the programming code.

4. The method of claim 1, wherein the set of facts comprises a set of historical facts referenced by the policy.

5. The method of claim 1, wherein processing the programming code is triggered by detecting a change to the programming code.

6. The method of claim 1, wherein processing the programming code is triggered by detecting a change to the build system.

7. The method of claim 1, wherein processing the programming code is triggered by detecting a change to the artifact.

8. The method of claim 1, wherein processing the programming code is triggered periodically.

9. The method of claim 1, wherein evaluating the policy is triggered periodically.

10. The method of claim 1, wherein evaluating the policy is triggered by detecting a change to the policy.

11. A system comprising:
at least one processor;
an application executing on the at least one processor to utilize one or more of a fact collector, a mapper, and a policy engine operating to:
process programming code, written in an imperative programming language, using the fact collector to instantiate a programming object, from the programming code, representing a set of facts of a build system comprising an artifact;
process the programming object using the mapper to expose the set of facts as a fact database,
wherein the fact database is organized into tables with rows and columns, and
wherein the mapper exposes the set of facts by mapping the set of facts, of the build system, stored in the programming object to the fact database;
evaluate a policy, written in a declarative programming language, and the fact database, exposing the set of facts from the programming object, using the policy engine to construct a result corresponding to the artifact of the build system; and
present the result comprising a supply chain security analysis of the artifact.

12. The system of claim 11, wherein presenting the result comprises:
locking access to the artifact to prevent use of the artifact based on the result.

13. The system of claim 11, wherein evaluating the policy comprises:
updating the result, by processing the policy, without updating the fact database, by processing the programming code.

14. The system of claim 11, wherein the set of facts comprises a set of historical facts referenced by the policy.

15. The system of claim 11, wherein processing the programming code is triggered by detecting a change to the programming code.

16. The system of claim 11, wherein processing the programming code is triggered by detecting a change to the build system.

17. The system of claim 11, wherein processing the programming code is triggered by detecting a change to the artifact.

18. The system of claim 11, wherein processing the programming code is triggered periodically.

19. The system of claim 11, wherein evaluating the policy is triggered periodically.

20. A non-transitory computer readable storage medium storing computer readable program code which, when executed by a processor, performs a computer-implemented method comprising:
processing programming code, written in an imperative programming language, using a fact collector to instantiate a programming object, from the programming code, representing a set of facts of a build system comprising an artifact;
processing the programming object using a mapper to expose the set of facts as a fact database,
wherein the fact database is organized into tables with rows and columns, and
wherein the mapper exposes the set of facts by mapping the set of facts, of the build system, stored in the programming object to the fact database;
evaluating a policy, written in a declarative programming language, and the fact database, exposing the set of facts from the programming object, using a policy engine to construct a result corresponding to the artifact of the build system; and
presenting the result comprising a supply chain security analysis of the artifact.

* * * * *

UNITED STATES PATENT AND TRADEMARK OFFICE
CERTIFICATE OF CORRECTION

PATENT NO. : 12,326,850 B2
APPLICATION NO. : 18/459318
DATED : June 10, 2025
INVENTOR(S) : Hassanshahi et al.

Page 1 of 1

It is certified that error appears in the above-identified patent and that said Letters Patent is hereby corrected as shown below:

In the Specification

In Column 10, Lines 17-21, delete "level 3 requirements can be broken . . . . . . . . . . . build automation tool." and insert the same on Line 16 as a continuation of the paragraph.

Signed and Sealed this
Twelfth Day of August, 2025

Coke Morgan Stewart
*Acting Director of the United States Patent and Trademark Office*